US011927399B2

(12) United States Patent
Omur et al.

(10) Patent No.: US 11,927,399 B2
(45) Date of Patent: Mar. 12, 2024

(54) AMMONIA FILLING SYSTEM

(71) Applicants: TUSAS-TURK HAVACILIK VE UZAY SANAYII ANONIM SIRKETI, Ankara (TR); GAZI UNIVERSITESI, Ankara (TR)

(72) Inventors: Cem Omur, Kazan/Ankara (TR); Ahmet Bilge Uygur, Kazan/Ankara (TR); Hasan Gurguc Isik, Kazan/Ankara (TR); Ilhami Horuz, Ankara (TR)

(73) Assignees: TUSAS-TURK HAVACILIK VE UZAY SANAYII ANONIM SIRKETI, Ankara (TR); GAZI UNIVERSITESI, Ankara (TR)

( * ) Notice: Subject to any disclaimer, the term of this patent is extended or adjusted under 35 U.S.C. 154(b) by 740 days.

(21) Appl. No.: 16/968,946

(22) PCT Filed: Feb. 12, 2019

(86) PCT No.: PCT/TR2019/050090
§ 371 (c)(1),
(2) Date: Aug. 11, 2020

(87) PCT Pub. No.: WO2019/245499
PCT Pub. Date: Dec. 26, 2019

(65) Prior Publication Data

US 2020/0370839 A1 Nov. 26, 2020

(30) Foreign Application Priority Data

Feb. 14, 2018 (TR) ................................ 2018/02067

(51) Int. Cl.
*F28D 15/02* (2006.01)
*F17C 5/04* (2006.01)
(Continued)

(52) U.S. Cl.
CPC ............ *F28D 15/0283* (2013.01); *F17C 5/04* (2013.01); *F17C 5/06* (2013.01); *F17C 7/00* (2013.01);
(Continued)

(58) Field of Classification Search
CPC ........................... F28D 15/0283; G01M 3/002
(Continued)

(56) References Cited

U.S. PATENT DOCUMENTS 2,428,876 A * 10/1947 Hawkins ................ F28F 9/013 62/235.1
4,106,554 A * 8/1978 Arcella .............. F28D 15/0275 165/274
(Continued)

FOREIGN PATENT DOCUMENTS

CN 102466199 A * 5/2012
JP 2003171656 A * 6/2003 ......... F28D 15/0258
SU 885748 A1 11/1981

OTHER PUBLICATIONS

U.S. National Aeronautics and Space Administration Heat Pipe Design Handbook, vol. 1 (Year: 1979).*
(Continued)

*Primary Examiner* — Timothy P. Kelly
*Assistant Examiner* — Christopher M Afful
(74) *Attorney, Agent, or Firm* — Notaro, Michalos & Zaccaria P.C.

(57) ABSTRACT

A filling system that has at least one heat pipe used for heat transfer, at least one ammonia tube that pure ammonia is able to be stored at room temperature as saturated vapour, at least one delivery line that enables to deliver ammonia from the ammonia tube to the heat pipe and the heat pipe is removably engaged, at least one valve is located on the delivery line and allows ammonia flow to be controlled, at
(Continued)

least one detector located on the delivery line and providing seal control, and at least one heater to heat the heat pipe.

12 Claims, 4 Drawing Sheets

(51) Int. Cl.

| | |
|---|---|
| ***F17C 5/06*** | (2006.01) |
| ***F17C 7/00*** | (2006.01) |
| ***F17C 13/00*** | (2006.01) |
| ***F17C 13/02*** | (2006.01) |
| ***F17C 13/04*** | (2006.01) |
| ***F17C 13/08*** | (2006.01) |
| ***F28D 15/04*** | (2006.01) |
| ***H05B 3/42*** | (2006.01) |

(52) U.S. Cl.

CPC .......... *F17C 13/001* (2013.01); *F17C 13/008* (2013.01); *F17C 13/026* (2013.01); *F17C 13/04* (2013.01); *F17C 13/08* (2013.01); *F28D 15/0233* (2013.01); *F28D 15/04* (2013.01); *H05B 3/42* (2013.01); *H05B 2203/032* (2013.01)

(58) Field of Classification Search

USPC .............................................. 165/185; 62/101

See application file for complete search history.

(56) References Cited

U.S. PATENT DOCUMENTS

| | | | | |
|---|---|---|---|---|
| 4,341,000 | A | 7/1982 | Stockman | |
| 4,881,580 | A | 11/1989 | Murphy et al. | |
| 6,817,096 | B2 | 11/2004 | McCullough | |
| 2014/0318169 | A1 | 10/2014 | Wits et al. | |
| 2022/0252304 | A1 * | 8/2022 | Green | F24H 3/025 |

OTHER PUBLICATIONS https://llis.nasa.gov/lesson/698 (Year: 1999).*

Cui, CN 102466199 A, English Translation (Year: 2012).*

Nomura, JP 2003171656 A, English Translation (Year: 2003).*

International Preliminary Report on Patentability for corresponding PCT application No. PCT/TR2019/050090, completed Nov. 12, 2020.

International Search Report and Written Opinion for corresponding PCT application No. PCT/TR2019/050090, mailed Mar. 20, 2020.

* cited by examiner

AMMONIA FILLING SYSTEM

RELATED TECHNICAL FIELD

The present invention relates to a filling system enabling to fill the heat pipes provided at space crafts and/or aircrafts with ammonia.

BACKGROUND OF THE INVENTION

Heat pipes are utilized at space crafts and/or aircrafts in order to transfer heat formed. In these heat pipes, heat delivery is performed by means of a fluid, wherein ammonia is the main fluid among such fluids. Operation of filling the heat pipes utilized for heat transfer at the space crafts and/or aircrafts with the ammonia is performed with high precision. Ammonia amount in the heat pipes affects heat transfer which is enabled by the heat pipes. Therefore, it is important to perform operation of filling the heat pipes with ammonia both in a precise and an energy-saving way.

Such an exemplary filling system is disclosed in published patent application U.S. Pat. No. 4,881,580A, wherein said document mentions a system which performs both filling and discharge operations for heat pipes and similar closed carriers. Here, water, ammonia, alcohol, and halogen hydrocarbons may be used inside the heat pipe as a pure fluid. The pure fluid chosen in appropriate amounts is controllably filled into the heat pipe via valves. However, it is not possible to provide high precision filling operation required for the space crafts and/or aircrafts and to obtain desired energy efficiency during a filling operation.

In the known state of art, filling of gas ammonia flow is also performed by using a compressor or a cooling tank, but these practices increase costs.

BRIEF DESCRIPTION OF INVENTION

The filling system according to the present invention comprises at least one heat pipe used for heat transfer, at least one ammonia tube in which pure ammonia is able to be stored at room temperature as saturated vapour, at least one delivery line which enables to transfer ammonia from the ammonia tube to the heat pipe and to which the heat pipe is removably engaged, at least one valve which is located on the delivery line and allows ammonia flow to be performed controllably, at least one detector located on the delivery line and used for a vacuuming and/or sealing test, and at least one heater to increase temperature of the heat pipe.

The filling system of the present invention comprises a base, and at least one chamber which has at least two walls extending outwardly from the base facing each another, wherein when the heat pipe is placed in the chamber so as to extend along the chamber, the heat pipe remains between the walls, and which, when heat is radiated inside the chamber by the heater, reflects the heat radiated by the heater through the inner sides of the walls to the heat pipe.

The filling system of the present invention delivers the ammonia from the ammonia tube, in which the ammonia in the gas phase is present, to the delivery line. The ammonia is controllably transferred from the delivery line to the heat pipe by at least one valve. Being delivered in the gas phase into the heat pipe, the ammonia is changed into liquid phase in the heat pipe upon cooling the heat pipe, thereby performing operation of filling the heat pipe with ammonia. Said cooling operation is conducted in the chamber.

In an embodiment of the invention, the filling system comprises at least one reflective member which is located in the chamber and is able to reflect heat. Preferably, the heat radiated by the heater with the help of the reflective member having a heat reflective bright surface can enable to heat the heat pipe in an efficient manner. This provides to save energy and heating time.

In another embodiment of the invention, the heater is such a type that is able to heat by infrared. Thanks to this, a quicker and effective heating is provided.

In an embodiment of the invention, the filling system comprises at least one cooling member which, when the heat pipe is desired to be cooled, is positioned inside the chamber and placed on the heat pipe to cool the heat pipe. During a filling operation into the heat pipe, the heat pipe is cooled via the cooling member for ammonia to be turned into a liquid phase. The cooling member is placed on the heat pipe so as to cool the heat pipe. Preferably, the cooling member is placed in the heat pipe such that the cooling member performs cooling operation from the end portion at which ammonia filling is not performed, towards the end portion at which ammonia filling is performed. This provides to fill the heat pipe with ammonia in an efficient manner.

In another embodiment of the invention, the cooling member is dry ice which is the solid phase of the carbon dioxide.

In an embodiment of the invention, the chamber comprises at least one support member located on the base, on which the heat pipe is placed and which enables the pipe to be positioned in the same direction with the delivery line. The support member enables to connect the heat pipe and the delivery line in the same alignment. Preferably, the support member is provided on the base in a position-adjustable way or provided on the base in a fixed and single-piece manner with the base.

In a further embodiment of the invention, the support member is not thermally conductive. This provides to transfer heat to the heat pipe in an efficient manner.

In another embodiment of the invention, the filling system has a reflective member being attachable to and detachable from the chamber. This enables to attach and detach the reflective member to and from the chamber when desired.

In another embodiment of the invention, the filling system comprises a reflective member which is attached by being adhered to the inner sides of the chamber. Thanks to this, the reflective member is fixedly provided in the chamber.

In an embodiment of the invention, the filling system comprises a connection member having a tube-fitting connection feature which enables to connect the heat pipe and the tubular delivery line. Preferably, cylindrical connections are firmly connected to each other via a ferrule tightened by a nut. Thanks to this, sealing is safely provided at the connection points under high pressure values. Therefore, filling heat pipes with ammonia is performed in a more efficient manner.

In another embodiment of the invention, the filling system comprises a heater which faces the heat pipe when the heat pipe is placed on the base of the chamber. This provides energy efficiency for heat transfer to the heat pipe.

In an embodiment of the invention, the filling system comprises at least one heat meter located on the delivery line or the heat pipe and measuring a temperature, and at least one control unit to control temperature of the heater depending on the temperature information obtained from the heat meter. This enables to keep temperature of the heat pipe at a predetermined level.

In another embodiment of the invention, chamber section is U-shaped.

In another embodiment of the invention, the ammonia filling system provides to fill the heat pipes utilized at space crafts and/or aircrafts with ammonia.

The filling system according to the present invention enables to fill the heat pipes with ammonia without disturbing degree of purity of the ammonia gas. Moreover, a single system is able to perform both filling and gas emission operations, thereby reducing the manufacturing process and costs. In addition, the developed system and method according to the invention is able to fill the heat pipes with ammonia, being in the gas phase at room conditions, in desired amounts without negatively affecting the heat transport capacity of the heat pipes.

OBJECT OF INVENTION

An object of the present invention is to provide a filling system which enables to fill the heat pipes with ammonia.

Another object of the present invention is to provide a filling system which enables to fill the heat pipes with pure ammonia gas without disturbing degree of purity thereof;

A further object of the present invention is to provide a low-cost filling system which enables to fill the heat pipes with ammonia gas, which is in gas phase at room conditions, at desired amounts.

Yet another object of the present invention is to provide a filling system to keep heat transfer capacity of the heat pipes at a desired level.

DESCRIPTION OF DRAWINGS

The filling system realized to achieve the object of the present invention is illustrated in attached drawings, in which.

Figure 1:
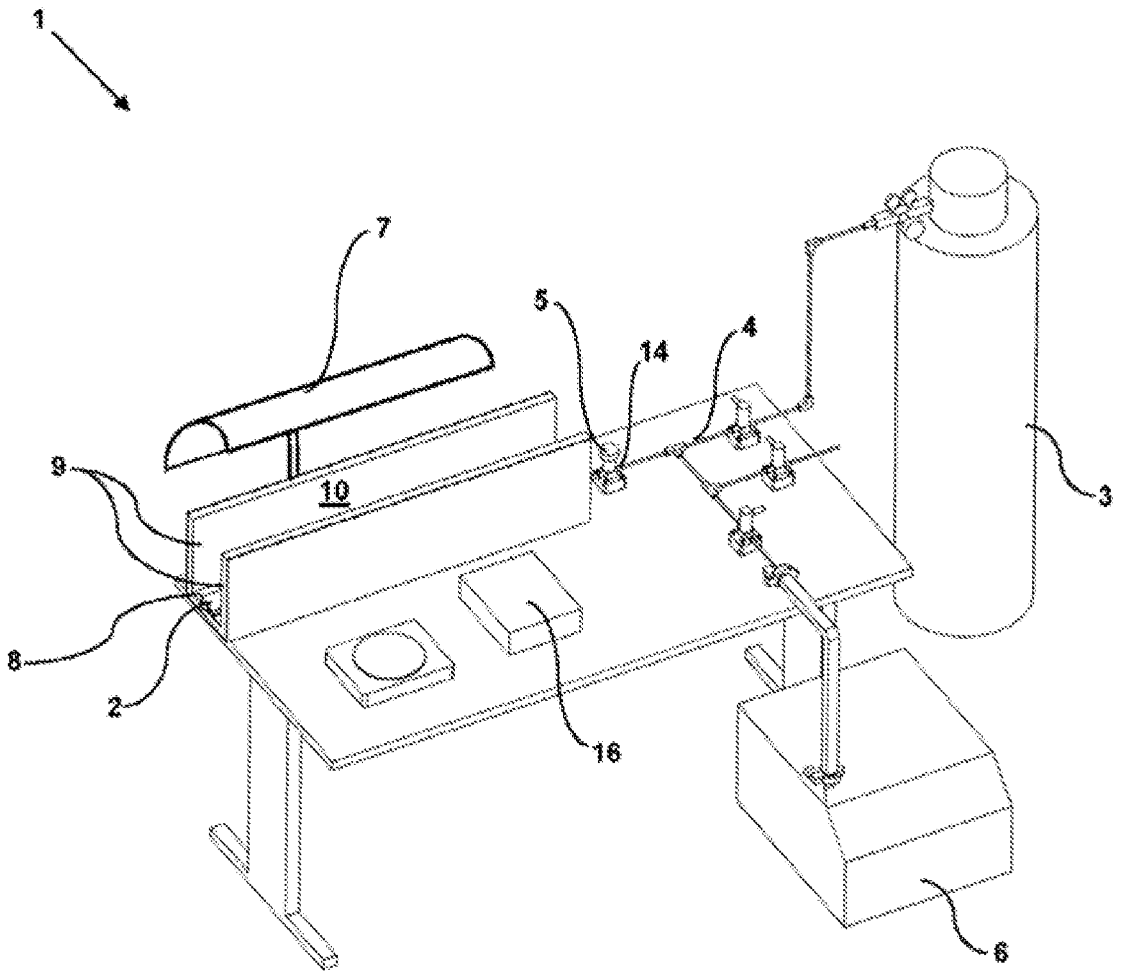
FIG. 1—is a perspective view of a filling system.

All the parts illustrated in the drawings are individually assigned a reference numeral and the corresponding terms of these numbers are listed as follows:

1. Filling System
2. Heat Pipe
3. Ammonia Tube
4. Delivery Line
5. Valve
6. Detector
7. Heater
8. Base
9. Wall
10. Chamber
11. Reflective Member
12. Cooling Member
13. Support Member
14. Connection Member
15. Heat Meter
16. Control Unit

DESCRIPTION OF INVENTION

The filling system (1) comprises at least one heat pipe (2) used for heat transfer, at least one ammonia tube (3) in which pure ammonia is able to be stored at room temperature as saturated vapour, at least one delivery line (4) which enables to deliver ammonia from the ammonia tube (3) to the heat pipe (2) and to which the heat pipe (2) is removably engaged, at least one valve (5) which is located on the delivery line (4) and allows ammonia flow to be controlled, at least one detector (6) located on the delivery line (4) and providing seal control, and at least one heater (7) to heat the heat pipe (2) (FIG. 1).

Figure 2:
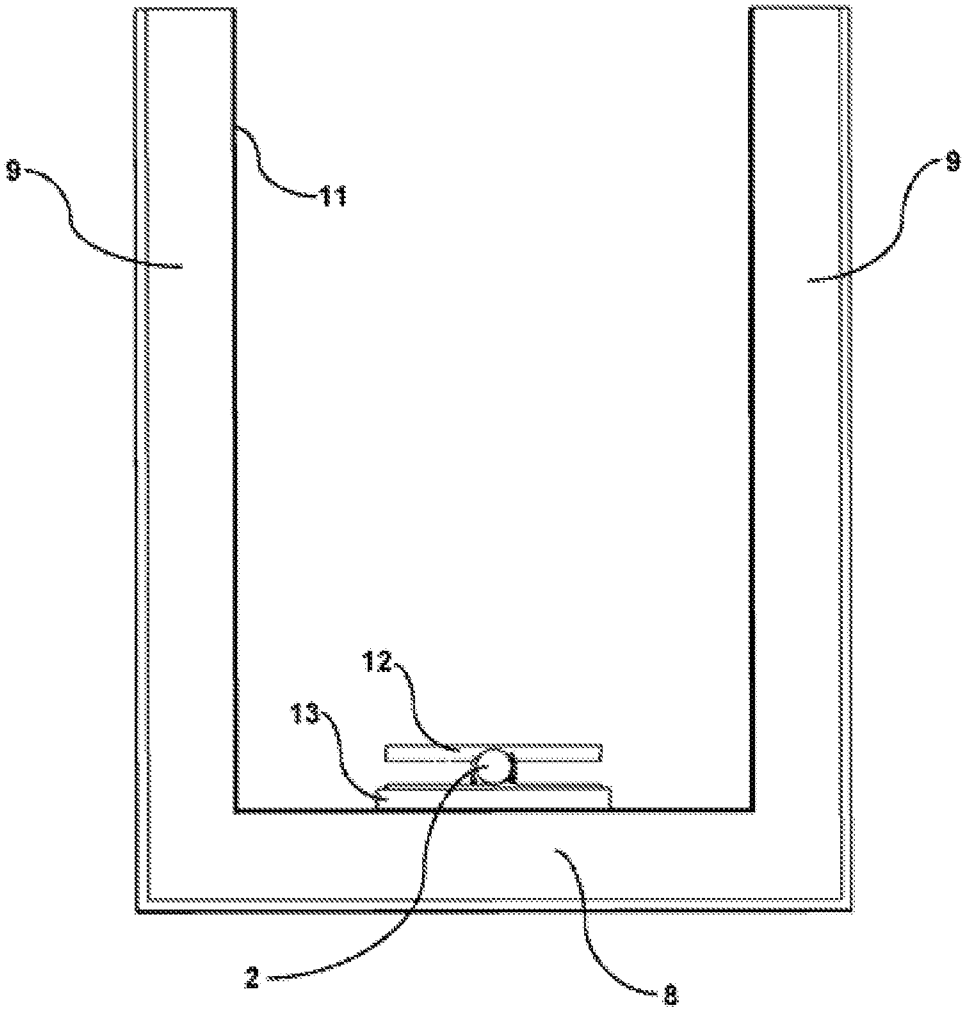
FIG. 2—is a sectional view of the chamber, filling system and cooling member.

The filling system (1) according to the invention comprises a base (8), and at least one chamber (10) which has at least two walls (9) extending outwardly from the base (8), wherein when the heat pipe (2) is placed in the chamber (10), the heat pipe (2) remains between the walls (9), and which, when heat is radiated inside the chamber (10) by the heater (7), reflects the heat radiated by the heater (7) through the inner sides of the walls (9) to the heat pipe (2) (FIG. 2).

The filling system (1) of the present invention delivers the ammonia from the ammonia tube (3), in which the ammonia almost in the gas phase is present, to the delivery line (4). The ammonia is able to be controllably delivered from the delivery line (4) to the heat pipe (2) by at least one valve (5). Being delivered almost in the gas phase into the heat pipe (2), the ammonia is liquefied in the heat pipe (2) upon cooling the heat pipe (2), thereby performing operation of filling the heat pipe (2) with ammonia. In the filling system (1), the heat pipe (2) is placed in the chamber so as to extend nearly along the chamber (10). Cooling operation is conducted inside the chamber (10). Before being filled with ammonia, the heat pipe (2) undergoes a sealing assessment by vacuuming. During a sealing assessment conducted via the detector (6), the heat pipe (2) is heated by the heater (7) in order to vacuum almost completely the gas inside the heat pipe (2). Operations of heating and cooling the heat pipe (2) are able to be performed in a more efficient manner thanks to the chamber (10) in which the heat pipe (2) is located.

In an embodiment of the invention, the filling system (1) comprises at least one reflective member (11) which is located in the chamber (10) and is able to reflect heat. Preferably, the heat radiated by the heater (7) with the help of the reflective member (11) having a bright surface can enable to heat the heat pipe (2) in an efficient manner. This provides to save energy and heating time.

In another embodiment of the invention, the filling system (1) comprises a heater (7) to heat by infrared. This minimises the heating time.

In an embodiment of the invention, the filling system (1) comprises at least one cooling member (12) which, when the heat pipe (2) is desired to be cooled, is positioned inside the chamber (10) and contacts with the heat pipe (2) to cool the heat pipe (2). During a filling operation into the heat pipe (2), the heat pipe (2) is cooled via the cooling member (12) for ammonia to be turned into a liquid phase. The cooling member (12) is placed in the chamber (10) so as to cool the heat pipe (2). This provides to cool the heat pipe (2) in an efficient manner.

In another embodiment of the invention, the cooling member (12) is dry ice. This enables to cool a desired area or full area of the heat pipe (2).

In an embodiment of the invention, the chamber (10) comprises at least one support member (13) located on the base (8), on which the heat pipe (2) is placed and which enables the heat pipe (2) to be in the same alignment with the delivery line (4). The support member (13) enables to connect the heat pipe (2) and the delivery line (4) in the same alignment. Preferably, the support member (13) is provided on the base (8) in a position-adjustable way or in a fixed and single-piece manner with the base (8).

In another embodiment of the invention, the support member (13) is thermally insulating. Thanks to this, thermal efficiency transferred to the heat pipe (2) is increased.

In another embodiment of the invention, the filling system (1) has a reflective member (11) being attached into the chamber (10) in a detachable way. This enables to attach and detach the reflective member (11) to and from the chamber (10) when desired.

In another embodiment of the invention, the filling system (1) comprises a reflective member (11) which is attached by being adhered into the chamber (10). Thanks to this, the reflective member (11) is fixedly provided in the chamber (10).

In an embodiment of the invention, the filling system (1) comprises a connection member (14) having a tube-fitting connection feature which enables to connect the heat pipe (2) and the delivery line (4). Preferably, tubular connections are firmly connected to each other via a ferrule tightened by a nut. Thanks to this, sealing is safely provided at the connection points under high pressure values. Therefore, filling heat pipes (2) with ammonia is performed in a more efficient manner.

In another embodiment of the invention, the filling system (1) comprises a heater (7) which faces the heat pipe (2) when the heat pipe (2) is placed on the base (8) of the chamber (10). This provides energy efficiency for heat transfer to the heat pipe (2).

Figure 3:
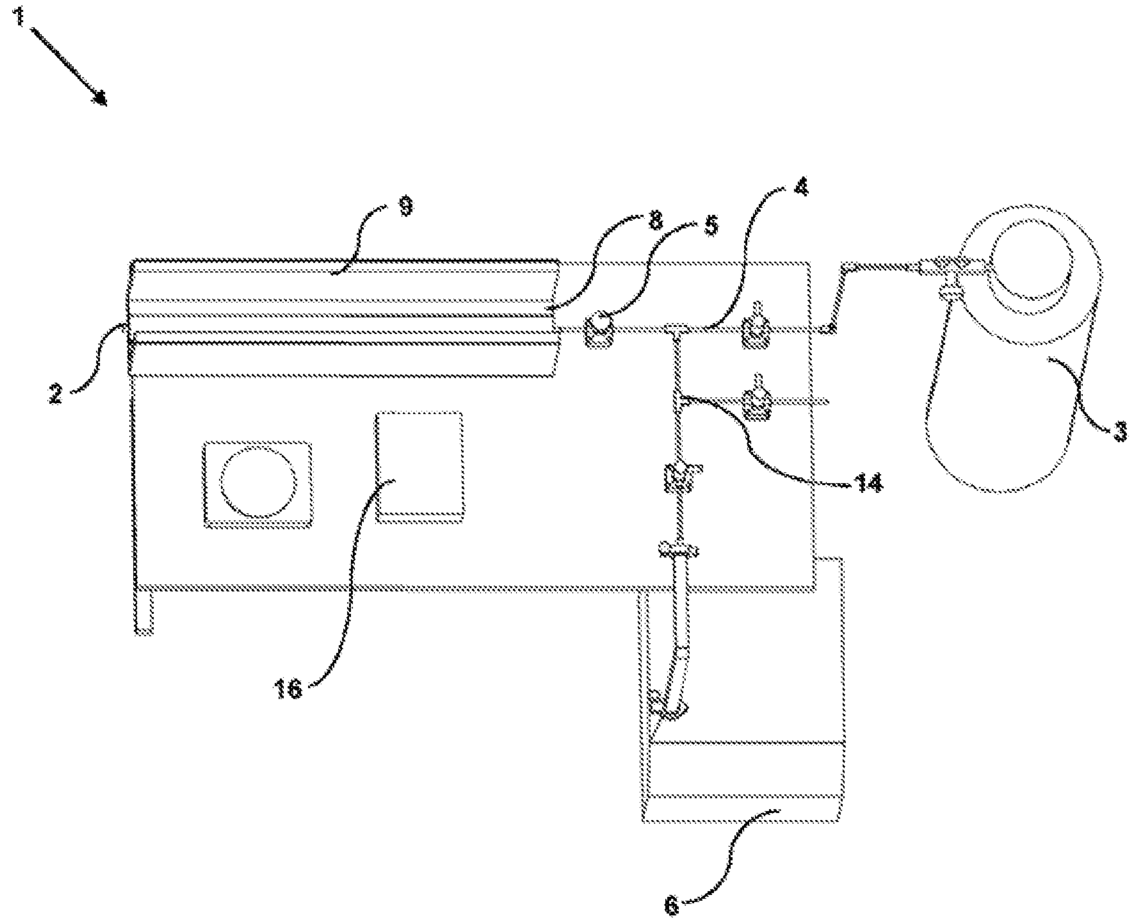
FIG. 3—is a top perspective view of the filling system.
Figure 4:
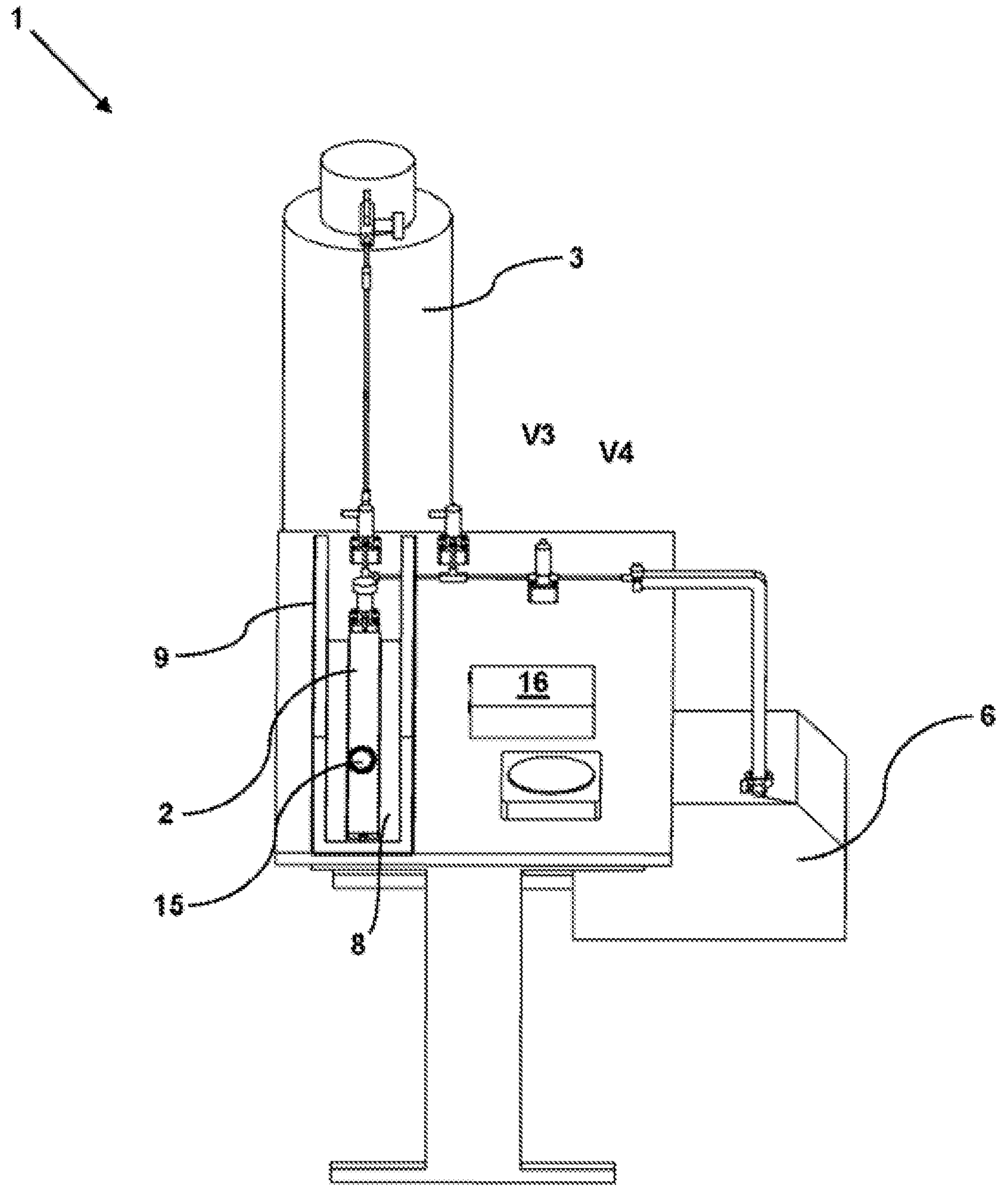
FIG. 4—is a side perspective view of the filling system.

In an embodiment of the invention, the filling system (1) comprises at least one heat meter (15) located on the delivery line (4) or the heat pipe (2) and measuring a temperature, and at least one control unit (16) to adjust temperature of the heater (7) depending on the temperature information obtained from the heat meter (15) (FIG. 3 and FIG. 4). This enables to keep temperature of the heat pipe (2) at a desired level.

In another embodiment of the invention, chamber (10) is U-shaped. Thanks to this, the heat pipe (2) is placed in the chamber in an easy way, and the heater (7) performs more effective heat transfer to the heat pipe (2).

In another embodiment of the invention, the heat pipe (2) is utilized at the space crafts and/or aircrafts for heat transfer. The filling system (1) resists against high pressure values and is able to fill the heat pipe (2) with ammonia in an effective manner. Therefore, heat transfer is performed in an effective manner at the space crafts and/or aircrafts via the heat pipes (2).

The filling system according to the present invention enables to fill the heat pipes (2) with ammonia without disturbing degree of purity of the ammonia gas. Moreover, a single system is able to perform both filling and gas emission operations, thereby reducing the manufacturing process and costs. In addition, the system (1) according to the invention is able to fill the heat pipes (2) with ammonia, being in the gas phase at room conditions, in desired amounts without negatively affecting the heat transport capacity of the heat pipes (2).

The invention claimed is:

1. A filling system (1) comprising:

at least one heat pipe (2) for heat transfer;

at least one ammonia tube (3) for storing pure ammonia at room temperature as saturated vapour;

at least one delivery line (4) removably engaged to the heat pipe (2) for delivering ammonia from the ammonia tube (3) to the heat pipe (2);

at least one valve (5) on the delivery line (4) for controlling ammonia flow through the delivery line (4);

at least one detector (6) on the delivery line (4) and providing seal control;

at least one heater (7) for heating the heat pipe (2);

a base (8);

at least one chamber (10) having at least two walls (9) extending outwardly from the base (8), wherein when the heat pipe (2) is placed in the chamber (10), the heat pipe (2) remains between the walls (9), and which, when heat is radiated inside the chamber (10) by the heater (7), the heat radiated by the heater (7) being reflected through the inner sides of the walls (9) to the heat pipe (2); and at least one cooling member (12) which, during a filling operation into the heat pipe (2), is positioned inside the chamber (10) adjacent to a first end of the heat pipe (2) opposite from a second end thereof where the at least one delivery line (4) is removably engaged to the heat pipe (2) and contacts with the heat pipe (2) to cool the heat pipe (2) so that ammonia within the heat pipe (2) is turned into a liquid phase as the heat pipe (2) is cooled from the first end thereof to the second end thereof.

2. The filling system (1) according to claim 1, comprising at least one reflective member (11) located in the chamber (10) for reflecting the heat radiated by the heater (7).

3. The filling system (1) according to claim 1, wherein at least one of the at least one heater (7) is an infrared heater.

4. The filling system (1) according to claim 1, wherein the cooling member (12) is dry ice.

5. The filling system (1) according to claim 1, comprising at least one support member (13) located on the base (8) for supporting the heat pipe (2) so that the heat pipe (2) is in a same alignment as the delivery line (4).

6. The filling system (1) according to claim 5, wherein at least one of the at least one support member (13) is thermally insulating.

7. The filling system (1) according to claim 2, wherein at least one of the at least one reflective member (11) is detachably attached to the chamber (10).

8. The filling system (1) according to claim 1, comprising a reflective member (11) adhered to an inner side of the chamber (10).

9. The filling system (1) according to claim 1, comprising a connection member (14) having a tube-fitting connection feature for connecting the heat pipe (2) to the delivery line (4).

10. The filling system (1) according to claim 1, wherein the heater (7) faces the heat pipe (2) when the heat pipe (2) is positioned on the base (8) of the chamber (10).

11. The filling system (1) according to claim 1, comprising at least one heat meter (15) for measuring temperature located on the delivery line (4) or the heat pipe (2), and at least one control unit (16) for adjusting a temperature output of the heater (7) depending on the temperature measured by the heat meter (15).

12. The filling system (1) according to claim 1, wherein the chamber (10) has a U-shape.

* * * * *